United States Patent
Bachl et al.

(10) Patent No.: US 9,560,670 B2
(45) Date of Patent: Jan. 31, 2017

(54) METHOD OF MANAGING COEXISTING PACKET STREAMS

(75) Inventors: Rainer Bachl, Nuremberg (DE); Matthias Schneider, Nuremberg (DE); Antonella Faniuolo, Wiltshire (GB)

(73) Assignee: Alcatel-Lucent USA Inc., Murray Hill, NJ (US)

(*) Notice: Subject to any disclaimer, the term of this patent is extended or adjusted under 35 U.S.C. 154(b) by 2631 days.

(21) Appl. No.: 12/051,393

(22) Filed: Mar. 19, 2008

(65) Prior Publication Data

US 2008/0232315 A1 Sep. 25, 2008

(30) Foreign Application Priority Data

Mar. 21, 2007 (EP) ..................... 07005776

(51) Int. Cl.
*H04W 4/00* (2009.01)
*H04W 72/12* (2009.01)
(Continued)

(52) U.S. Cl.
CPC ........ *H04W 72/1278* (2013.01); *H04L 1/0001* (2013.01); *H04L 1/1854* (2013.01);
(Continued)

(58) Field of Classification Search
USPC ................................. 370/329, 338
See application file for complete search history.

(56) References Cited

U.S. PATENT DOCUMENTS

2006/0291393 A1* 12/2006 Teague et al. ............ 370/235
2007/0019596 A1* 1/2007 Barriac et al. ........... 370/338
2009/0022098 A1* 1/2009 Novak et al. ............ 370/329

FOREIGN PATENT DOCUMENTS

EP 1608194 A1 12/2005

* cited by examiner

*Primary Examiner* — Derrick Ferris
*Assistant Examiner* — Farhad Ali
(74) *Attorney, Agent, or Firm* — Fay Sharpe, LLP

(57) ABSTRACT

The invention concerns a method of managing coexisting packet streams (100, 110) in a wireless communication system, and a corresponding controller and a mobile terminal. A first packet stream (110) of the coexisting packet streams (100, 110) requires transmission resources of the wireless communication system at fixed time intervals, and a second packet stream (100) of the coexisting packet streams (100, 110) requires transmission resources of the wireless communication system at dynamically determined time intervals. A schedule defining allocations of transmission resources for the first packet stream (110) is set up. A request for an initial grant of transmission resources for a transmission of a data packet (101) of the second packet stream (100) is issued. In the process of allocating transmission resources to the second packet stream (100), the controller analyzes the schedule of transmission resources allocated to the first packet stream (110) and thereby determines whether a retransmission (102, 103) of the data packet (101) associated with the second packet stream (100) is possible to collide with a transmission of a data packet (111, 112) associated with the first packet stream (110) according to the schedule. The controller transmits a parameter specifying a number N of retransmissions (102, 103) possible without such collision as part of the initial grant of transmission resources to the mobile terminal.

10 Claims, 5 Drawing Sheets

(51) Int. Cl.
*H04W 74/08* (2009.01)
*H04L 1/00* (2006.01)
*H04L 1/18* (2006.01)
*H04W 76/02* (2009.01)

(52) U.S. Cl.
CPC ......... *H04W 74/085* (2013.01); *H04L 1/1896* (2013.01); *H04W 76/025* (2013.01)

METHOD OF MANAGING COEXISTING PACKET STREAMS

The invention is based on a priority application EP 07 005 776.5 which is hereby incorporated by reference.

TECHNICAL FIELD

The present invention relates to a method of managing coexisting packet streams in wireless communication systems, as well as to a controller for managing said coexisting packet streams, and a mobile terminal for supporting the method.

BACKGROUND OF THE INVENTION

In next-generation packet-based wireless systems like UMTS Long-term Evolution, VoIP will be an important service to be supported (UMTS=Universal Mobile Telecommunications System). However, VoIP data has unique traffic characteristics that differ from other packet data services. VoIP packets are very small, equally sized and periodically created at constant intervals and face tight delay and jitter requirements.

Considering these characteristics, dynamic scheduling like being used for other data services would lead to an enormous amount of signaling overhead. With dynamic scheduling, each user inside a cell is signaled the designated transmission resources explicitly once every scheduler interval via a special control channel. In case the scheduled data blocks are very small and numerous the control channel may reach its maximum capacity limit although the actual data channel has not reached the peak of its capacity. Furthermore, the dynamic scheduling of equally sized VoIP packets leads to large amounts of redundant signaling since explicit signaling is used for each packet in order to allocate the same amount of resources at a constant time interval.

One way to tackle the problem of increasing the signaling overhead is to employ a scheme called persistent scheduling. According to this scheme, a resource is allocated only once at the beginning of the recurring transmissions at specifically time intervals. During the persistent scheduled transmission, no additional signaling overhead is required after the initial resource allocation, thus reducing the control channel overhead significantly.

In case a synchronous HARQ (=Hybrid Automatic Repeat Request) retransmission scheme is used as is the case with UMTS LTE uplink, it is possible that the HARQ retransmission of dynamically scheduled data collides with a persistently scheduled resource (LTE=Long-Term Evolution). To avoid collisions, a persistent scheduled allocation may be shifted in time and/or frequency.

SUMMARY OF THE INVENTION

It is the object of the present invention to improve the management of coexisting packet streams in wireless communication systems.

The object of the present invention is achieved by a method of managing coexisting packet streams in a wireless communication system, wherein a first packet stream of the coexisting packet streams requires transmission resources of the wireless communication system at fixed time intervals and a second packet stream of the coexisting packet streams requires transmission resources of the wireless communication system at dynamically determined time intervals, whereby the method comprises the steps of setting up a schedule defining allocations of transmission resources for the first packet stream; receiving a request for an initial grant of transmission resources for a transmission of a data packet of the second packet stream from a sending unit of the second packet stream; in the process of allocating transmission resources of the wireless communication system to the second packet stream, analysing the schedule of transmission resources allocated to the first packet stream and thereby determining whether a retransmission of the data packet associated with the second packet stream is possible to collide with a transmission of a data packet associated with the first packet stream according to the schedule; and transmitting a parameter specifying a number N of retransmissions possible without such collision as part of the initial grant of transmission resources to the sending unit of the second packet stream. The object of the present invention is further achieved by a controller for managing coexisting packet streams in a wireless communication system, wherein a first packet stream of the coexisting packet streams requires transmission resources of the wireless communication system at fixed time intervals and a second packet stream of the coexisting packet streams requires transmission resources of the wireless communication system at dynamically determined time intervals, whereby the controller comprises a scheduling unit adapted to set up a schedule defining allocations of transmission resources for the first packet stream, receive a request for an initial grant of transmission resources for a transmission of a data packet of the second packet stream from a sending unit of the second packet stream, analyse, in the process of allocating transmission resources of the wireless communication system to the second packet stream, the schedule of transmission resources allocated to the first packet stream and thereby determine whether a retransmission of the data packet associated with the second packet stream is possible to collide with a transmission of a data packet associated with the first packet stream according to the schedule, and transmit a parameter specifying a number N of retransmissions possible without such collision as part of the initial grant of transmission resources to the sending unit of the second packet stream. And the object of the present invention is achieved by a mobile terminal comprising a sending unit for communicating via a packet-based wireless communication system, wherein first packet streams of a plurality of coexisting wireless packet streams require transmission resources of the wireless communication system at fixed time intervals and a second packet stream of the coexisting wireless packet streams requires transmission resources of the wireless communication system at dynamically determined time intervals, and wherein the mobile terminal is associated with the second packet stream, whereby the sending unit comprises a controller adapted to send a request for an initial grant of transmission resources for a transmission of a data packet of the second packet stream to a scheduling unit of the communication system, receive a parameter specifying a number N of retransmissions of the data packet as part of the initial grant of network resources from the scheduling unit, and limit the number of retransmissions of the data packet to the specified number N.

The situation that one of the retransmissions of a data packet associated with the second packet stream falls together with a persistently scheduled resource associated with the first packet stream and creates a collision can be avoided by explicitly limiting at the initial resource allocation the maximum number of retransmissions of dynamically scheduled resources if the possibility of a collision with a fixed scheduled resource exists. This information is known by the scheduling unit and can be transmitted as part of the explicit resource grant for the dynamically scheduled resource.

The described approach of explicitly limiting the maximum number of retransmissions of dynamically scheduled resources applies to all systems with synchronous retransmissions where transmissions with a fixed time interval have to be time-division multiplexed (TDM) with dynamic transmissions.

In systems with synchronous HARQ transmissions, coexistence of persistently scheduled users and dynamically scheduled users is made possible. In particular, collisions of transmissions from dynamically scheduled users and persistently scheduled users or other time multiplex services are avoided.

The invention covers an important aspect of the physical layer for wireless VoIP communications by allowing a coexistence of persistently scheduled transmissions and dynamically scheduled transmissions by avoiding collisions from HARQ retransmissions.

The available time frequency resources are more efficiently utilized for transmissions and time frequency resources need not be left unused for the purpose of avoiding collisions of transmissions from persistently scheduled users and dynamically scheduled users.

As a result, spectral efficiency is increased and more packet data users can be supported in the mobile communication system.

Preferably, the invention avoids collisions between persistently scheduled transmissions and HARQ retransmissions of dynamically scheduled users in the uplink. In particular, the dynamically scheduled user will be informed with extra control information about the maximum possible number of retransmissions so that none of its retransmissions can collide with a persistent transmission.

A HARQ retransmission scheme makes use of acknowledgements (=ACKs) and negative acknowledgements (=NACK) that are transmitted via control channel in the opposite direction of the data flow in case data segment is/is not correctly received. If a data segment is NACKed, a retransmission takes place. In case synchronous HARQ is employed on a communication channel, retransmissions always takes place of the fixed time intervals. The maximum number of retransmissions may be limited by the system. Dynamically scheduled and persistently scheduled resources may both make use of synchronous HARQ retransmissions.

Further advantages are achieved by the embodiment of the invention indicated by the dependent claims.

According to a preferred embodiment of the invention, the number N of retransmissions applicable to the second packet stream so that a collision is not possible is dynamically determined during the process of allocating transmission resources of the wireless communication system to the second packet stream. Dynamically in this context means that the number N is determined in an individual manner for each received request for a grant of transmission resource.

According to another preferred embodiment of the invention, the number N of retransmissions of the data packet associated with a second packet stream that are possible without such collision is a predefined number. The allocation of transmission resources of the wireless communication system to the second packet stream is controlled in such a way that the allocation meets this requirement. The scheduling unit checks whether N retransmissions of the data packet associated with a second packet stream are possible without collision. If this is not possible, the scheduling unit changes the parameters of the allocation and retries the allocation with the changed parameters or the scheduling unit applies a time shift to the request and retries the allocation later-on.

Preferably, the number of retransmissions of the data packet in the second packet stream is limited by the sending unit of the second packet stream to the number N specified in the initial grant received by the sending unit from the controller. A data packet associated with the second packet stream is discarded if the data packet has not been correctly received by destination unit of the N retransmissions.

It is also possible that a retransmission of a data packet associated with a second packet stream is suspended if the data packet has not been correctly received by a destination unit after N retransmissions. The controller then determines, dependent on the schedule of transmission resources allocated to the first packet stream, transmission resources for resuming the retransmission of the data packet in the second packet stream, whereby the transmission resources may comprise frequency band and a time interval. The controller then transmits a retransmission grant with a specification of the determined transmission resources to the sending unit whereby the retransmission of the data packet will not collide with the transmission of a data packet associated with the first packet stream. Consequently, the terminal will resume the retransmission of the data packet in accordance with a determined transmission resource.

In case synchronous HARQ is employed on a communication channel, retransmissions always take place after fixed time intervals, preferably according to a fixed time grid. According to a preferred embodiment of the invention, the controller determines transmission resources by shifting the retransmission of the data packet in time relatively to the schedule associated with the first packet stream. Preferably, the shifting of the retransmission of the data packet in time is executed relatively to a fixed time grid.

If desired, the retransmissions for the dynamically scheduled user can be continued with a separate resource allocation. The association between the original transmission/retransmissions and the continued retransmissions can be made implicitly by using the same frequency resources and the time resources on the earlier time grid of the retransmissions or explicitly by signaling a HARQ process ID (=identification/identifier). This way the retransmission grant is associated with the initial grant of transmission resources and the terminal is able to associate the retransmission grant with the initial grant.

Preferably, the continuation of retransmissions is allowed at a later position in time. In order to allow this, a special explicit retransmission grant may be issued, specifying the resource where the continued retransmissions will take place. The resources may include a frequency band/range and a time interval. This retransmission grant may also include a maximum number of retransmission in case it also could lead to a collision with a persistently scheduled resource. Since multiple HARQ processes may operate simultaneously the retransmission grant has to be associated to the HARQ process of the initial transmission. This may be done implicitly by scheduling the continued retransmission and the same frequency and time resources like the initial transmission or by explicitly referring to a HARQ process ID that is signaled in both, the initial scheduling grant and the retransmission grant. This allows the continuation of the remaining retransmissions until the maximum number of retransmissions of the system is reached. In case the user equipment is aware of the location in time and frequency of the persistently scheduled resources, the maximum number of retransmissions does not have to be explicitly transmitted.

Preferably, the terminal continues the retransmissions of a data packet associated with the second packet stream until a maximum number of retransmissions predefined for the second packet stream is reached. It is also possible that a maximum number of retransmissions is inherent to the communication system and that the retransmissions definitely come to an end when this maximum number has been reached (timeout).

In the described packet stream, the terminal transmits its packets to a base station. It is possible that a data packet does not reach its destination or is not correctly received, e.g., due to interference. According to a preferred embodiment of the invention, the destination unit where the data packets are directed (i.e. the base station) indicates if it has received a data packet or if a data packet is not correctly received. Consequently, the terminal re-transmits a data packet if the destination unit indicates that the data packet is not received or is not correctly received by the destination unit and if the defined maximum number N of retransmissions of the data packet has not yet been reached.

BRIEF DESCRIPTION OF THE DRAWINGS

These as well as further features and advantages of the invention will be better appreciated by reading the following detailed description of presently preferred exemplary embodiments taken in conjunction with the accompanying drawings of which.

DETAILED DESCRIPTION OF PREFERRED EMBODIMENTS

Figure 1:
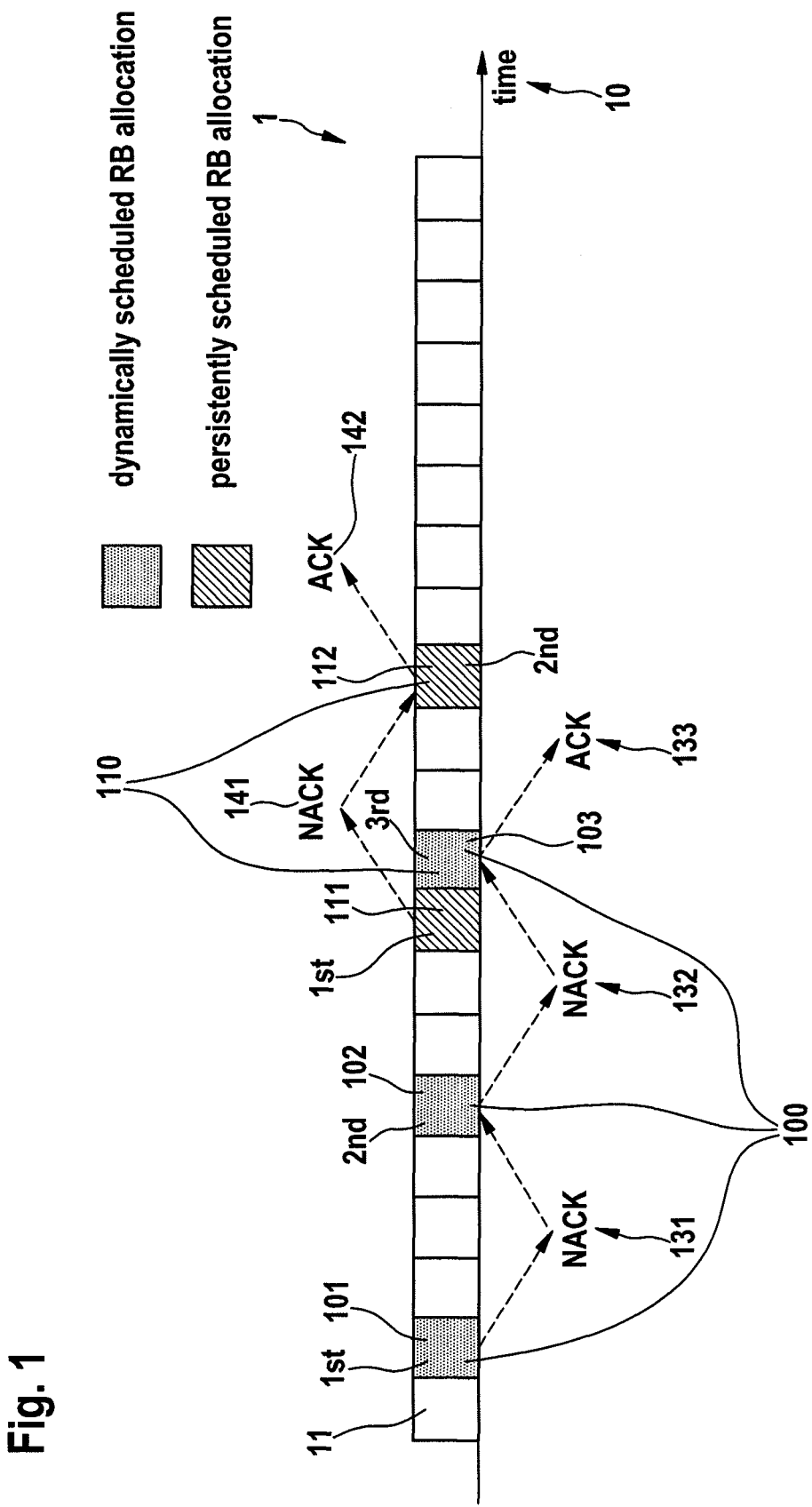
FIG. 1 is a block diagram of a data flow of two coexisting packet streams without collisions from retransmissions.

FIG. 1 shows a communication channel 1 comprising a data flow of data segments 11 over time 10. The data segments 11 comprise two coexisting packet streams, one packet stream 100 requiring dynamically scheduled resources and the other packet stream 110 requiring persistently scheduled resources. A data packet 101 associated with the dynamically scheduled packet stream 100 is first transmitted but is not correctly received by the destination. Therefore, the destination sends a negative acknowledgement NACK 131 that is transmitted via a control channel in the opposite direction of the data flow. Following the HARQ retransmission scheme, the data packet 102 is consequently retransmitted, but again the data packet 102 is not correctly received by the destination. Therefore, the destination sends a second NACK message 132 which triggers the third transmission of the data packet 103 which is finally correctly received by the destination and is consequently acknowledged with the ACK message 133. The coexisting persistently scheduled packet stream 110 comprises the transmission of a data packet 111 which is not correctly received by its destination, and therefore a NACK message 141 is sent from the destination. Consequently, within the HARQ retransmission scheme, the retransmission of the data packet 112 takes place after fixed time intervals. Finally, the retransmitted data segment 112 is correctly received by its destination and consequently acknowledged by an ACK message 142.

As becomes clear from FIG. 1, in case synchronous HARQ is employed on the communication channel 1, retransmissions always take place after fixed time intervals, here after three time intervals. FIG. 1 describes the case of a coexistence of a persistently and a dynamically scheduled packet stream without collisions from HARQ retransmissions. Therefore, a scheduling unit for managing coexisting packet streams determines that a deliberately large number of retransmissions may take place on the packet stream 100 requiring dynamically scheduled resources without running into a collision.

Figure 2:
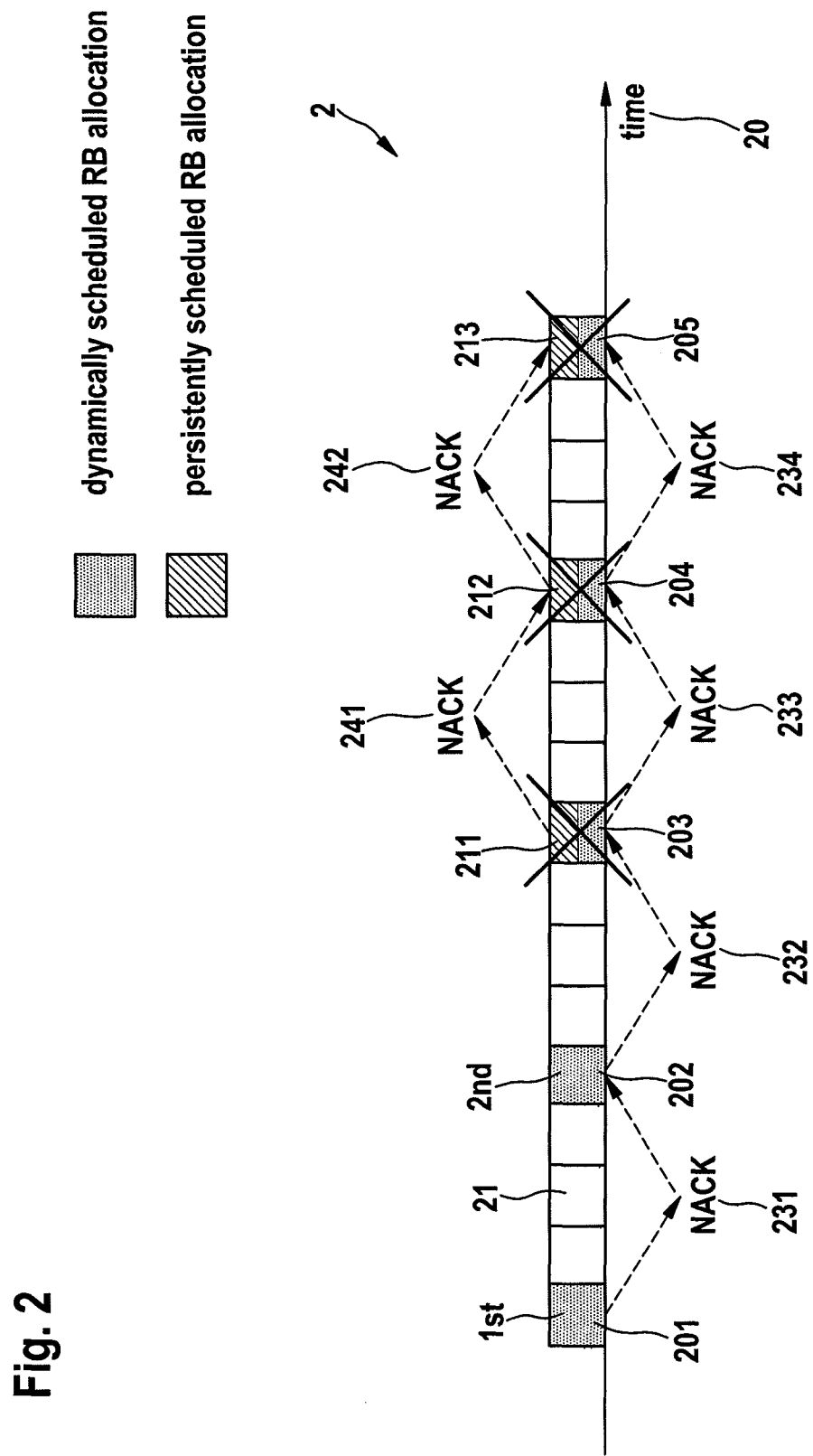
FIG. 2 is a block diagram of a data flow of two coexisting packet streams with impending collisions from retransmissions.

FIG. 2 shows a situation with a possible collision problem that can be solved by the present invention. FIG. 2 shows a communication channel 2 comprising a data flow of data segments 21 over time 20. The data segments 21 comprise two coexisting packet streams, one packet stream requiring dynamically scheduled resources and the other packet stream requiring persistently scheduled resources. For further details we refer to FIG. 1. Due to a relative time shift of the data segments associated with a dynamically scheduled packet stream there would be a collision of a retransmission of a data packet 203 associated with a dynamically scheduled packet stream and a transmission of a data packet 211 associated with the persistently scheduled packet stream. As a synchronous HARQ is employed on the communication channel, the retransmissions both for the dynamically scheduled packet stream and the persistently scheduled packet stream always takes place after fixed time intervals. Therefore, also the further retransmissions of the dynamically scheduled packet stream and the persistently scheduled packet stream will collide as it is shown in the case 204, 212 and 205, 213. Therefore, it is this situation shown in FIG. 2 where the method according to the present invention is utilized to avoid any collisions. At this point, the scheduling unit determines a limitation of retransmissions, as will be described with reference to FIG. 3.

Figure 3:
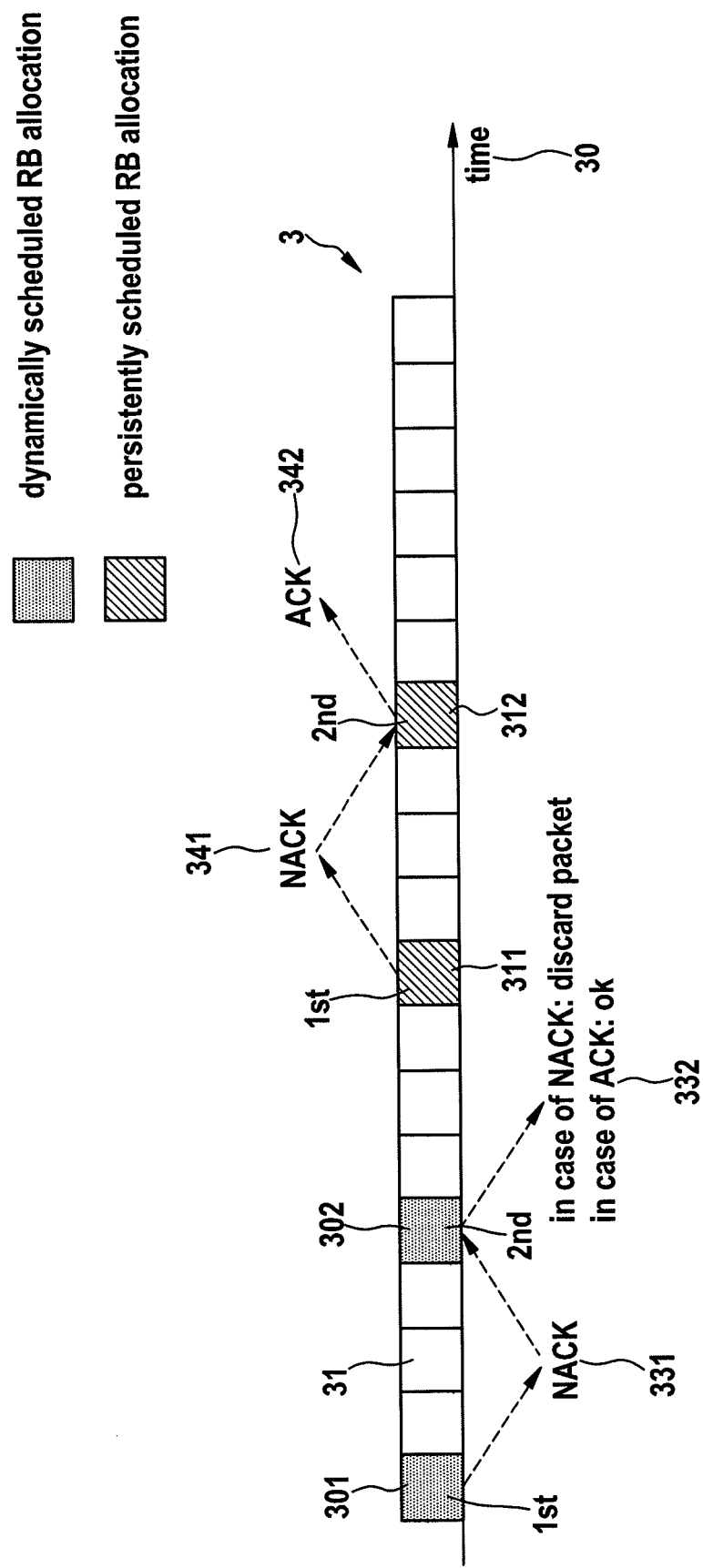
FIG. 3 is a block diagram of a data flow of two coexisting packet streams without collisions due to a limitation in the number of retransmissions.

FIG. 3 shows an embodiment where a limitation in the number of synchronized HARQ retransmissions has been applied to avoid a collision between a dynamically scheduled packet stream and a persistently scheduled packet stream. FIG. 3 shows a communication channel 3 over time 30 whereby the communication channel 3 comprises a dynamically scheduled packet stream and a persistently scheduled packet stream. A data packet 301 associated with the dynamically scheduled packet stream is transmitted but not correctly received by its destination. Therefore, it is NACKed 331 and retransmitted 302. Since a third transmission of the data packet would collide with the transmission of a data packet 311 associated with the persistently scheduled packet stream, the data packet associated with the dynamically scheduled packet stream will be discarded 332 in case of a new NACK message. According to the invention, the number of retransmissions of the data packet associated with the dynamically scheduled packet stream is limited, so that a collision with a (re-) transmission of a data packet associated with the persistently scheduled packet stream is ruled out. In case the reception of the retransmitted data packet 302 is acknowledged, there is no possibility of a collision and it is okay, anyway.

Figure 4:
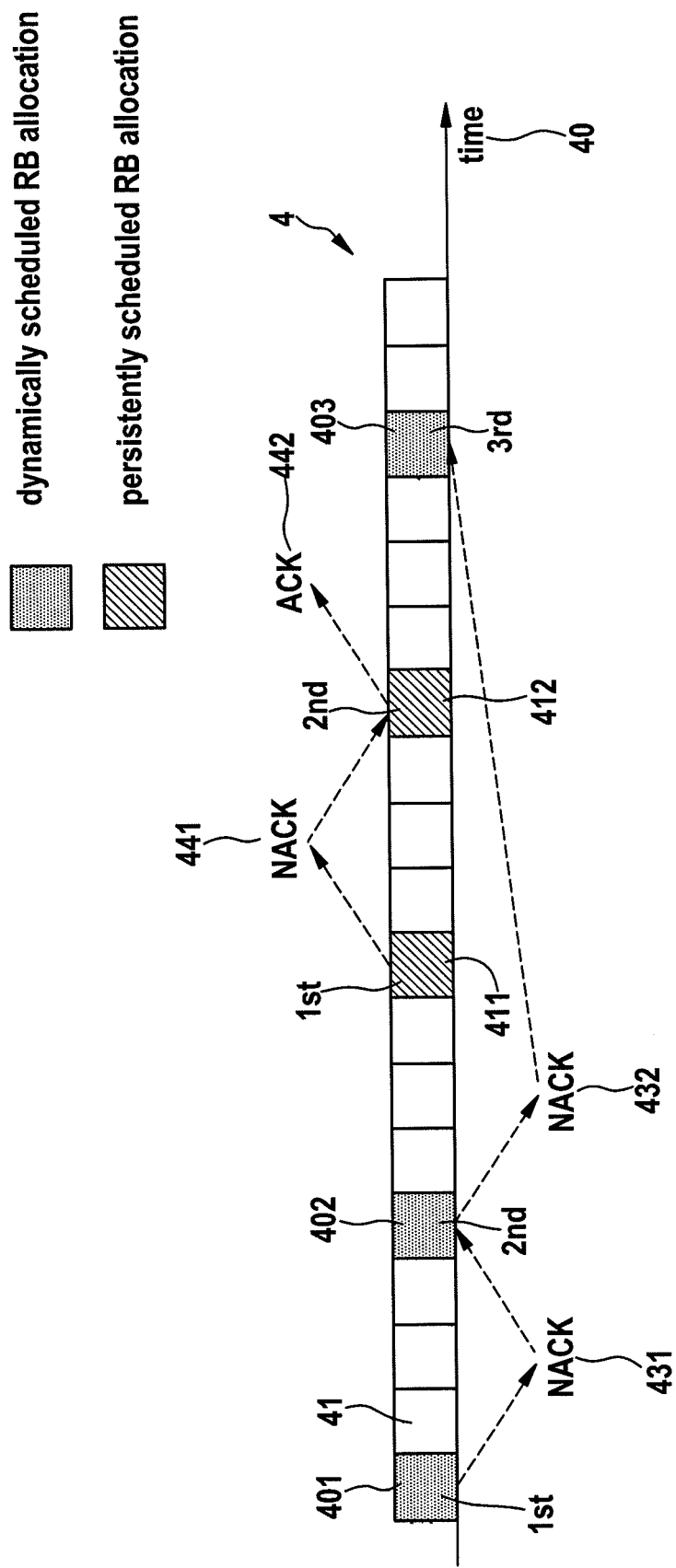
FIG. 4 is a block diagram of a data flow of two coexisting packet streams without collisions due to a limitation in the number of synchronous retransmissions and continuation of the retransmissions at a later stage.

FIG. 4 shows an embodiment of the present invention where a limitation in the number of synchronous HARQ retransmissions is applied and the HARQ retransmissions are continued at a later stage. In detail, when a data packet 401 associated with a dynamically scheduled packet stream is transmitted by a terminal and not correctly received, it is NACKed 431. The NACK 431 triggers the terminal to retransmit the data packet 402 after fixed time intervals, here after three time intervals. Again, the retransmitted data packet 402 associated with the dynamically scheduled packet stream has not correctly arrived at the destination and is therefore again NACKed 432. Because a further retransmission of the data packet 402 associated with the dynamically scheduled packet stream would collide with a transmission 411 of a data packet associated with a persistently scheduled packet stream, the retransmission of the data packet 402 is suspended and is continued 403 after the transmissions of the data packet 411, 412 associated with the persistently scheduled packet stream has succeeded. Therefore, collisions between transmissions of dynamically scheduled packet streams and persistently scheduled packet streams are avoided.

Figure 5:
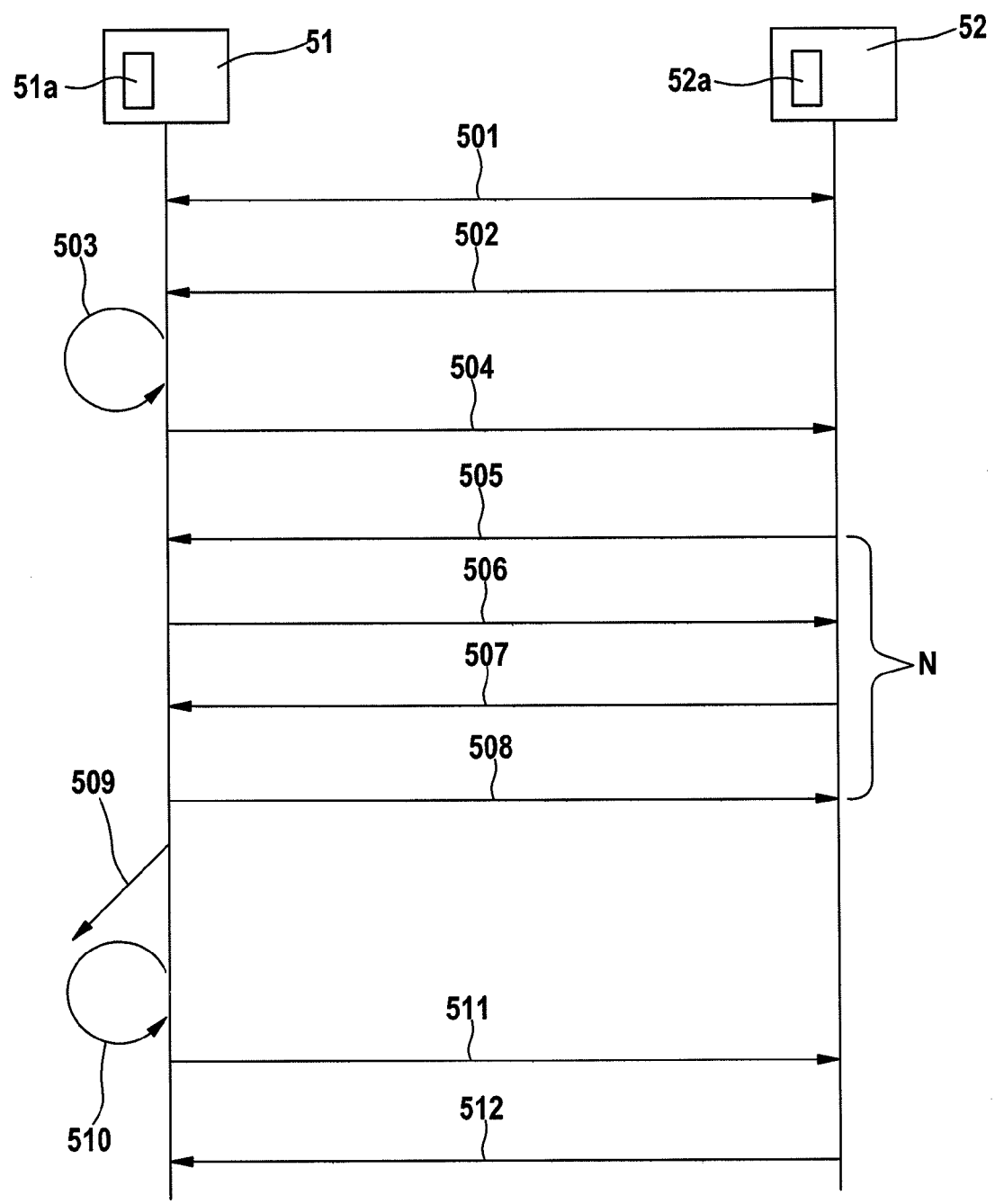
FIG. 5 is a block diagram of a communication between a controller and a mobile terminal associated with a packet stream using dynamically scheduled transmissions.

FIG. 5 shows a controller 51 with a scheduling unit 51a, and a mobile terminal 52 with a controller 52a. After a packet stream agreement 501 has been reached between the controller 51 and the mobile terminal 52, the terminal 52 sends a request 502 for a grant of transmission resources when the terminal intends to send a data packet. The controller 51 forwards the received request 502 to the scheduling unit 51a of the controller 51 which analyses 503 the request from the terminal 52 with regard to persistently scheduled packet streams also handled by the controller 51.

The scheduling unit 51a determines a number N of retransmissions that are possible without a collision of the dynamically scheduled packet stream associated with the terminal 52 and the persistently scheduled packet streams handled by the controller 51. The determined number N of retransmissions that are possible without collisions is transmitted as part of an initial grant of transmission resources 504 to the terminal 52. The terminal forwards the received initial grant with the determined number N to the controller 52a of the terminal 52. According to this initial grant of transmission resources, the controller 52a triggers the transmission of a data packet 505. If the terminal 52 receives a NACK message 506 it retries the retransmission 507 of the data packet according to a retransmission scheme.

The retransmissions and the NACK messages 507, 508 may continue until the number N of retransmissions has been performed. Then the controller 52a of the terminal 52 discontinues the retransmissions. According to the present invention, a data packet which has not yet been received or not correctly received by its destination, may be discarded 509 at this stage or may be suspended for a retransmission at a later stage. In the latter case, the scheduling unit 51a of the controller 51 will determine retransmission resources for resuming the retransmission of the data packet in the second packet stream and will transmit a retransmission grant 511 to the terminal 52. The terminal 52 receives the retransmission grant 511, forwards the received retransmission grant 511 to the controller 52a, and the controller 52a initiates the retransmission of the data packets 512 according to allocation parameters specified in the retransmission grant 511.

The invention claimed is:

1. A method of managing coexisting packet streams in a wireless communication system, wherein a first packet stream of the coexisting packet streams utilizes transmission resources of the wireless communication system at fixed time intervals and a second packet stream of the coexisting packet streams utilizes transmission resources of the wireless communication system at dynamically determined time intervals, the method comprising:
   setting up a schedule defining allocations of transmission resources for the first packet stream;
   receiving a request for an initial grant of transmission resources for a transmission of a data packet of the second packet stream from a sending unit of the second packet stream;
   in the process of allocating transmission resources of the wireless communication system to the second packet stream, analysing the schedule of transmission resources allocated to the first packet stream and thereby determining whether a retransmission of the data packet associated with the second packet stream is possible to collide with a transmission of a data packet associated with the first packet stream according to the schedule; and
   transmitting a parameter specifying a number N of retransmissions possible without such collision as part of the initial grant of transmission resources to the sending unit of the second packet stream.

2. The method of claim 1, wherein the process of allocating transmission resources of the wireless communication system to the second packet stream further comprises:
   dynamically determining the number N of retransmissions applicable to the second packet stream so that a collision is not possible.

3. The method of claim 1, wherein the process of allocating transmission resources of the wireless communication system to the second packet stream further comprises:
   determining an allocation of transmission resources for the second packet stream where a pre-defined number of N retransmissions of the data packet associated with the second packet stream is possible without such collision.

4. The method of claim 1, further comprising:
   limiting, by the sending unit of the second packet stream, the number of retransmissions of the data packet of the second packet stream to the number N specified in the initial grant; and
   discarding a data packet associated with the second packet stream if the data packet has not been correctly received by a destination unit after N retransmissions.

5. The method of claim 1, further comprising:
   suspending a retransmission of a data packet associated with the second packet stream if the data packet has not been correctly received by a destination unit after N retransmissions;
   dependent on the schedule of transmission resources allocated to the first packet stream, determining transmission resources for resuming the retransmission of the data packet in the second packet stream;
   transmitting a retransmission grant with a specification of the determined transmission resources to the sending unit; and
   resuming the retransmission of the data packet in accordance with the determined transmission resources.

6. The method of claim 5, wherein the method further comprises:
   determining transmission resources by shifting the retransmission of the data packet in time relatively to the schedule associated with the first packet stream.

7. The method of claim 5, wherein the method further comprises:

shifting the retransmission of the data packet in time according to a fixed time-grid.

8. The method of claim 5, wherein the method further comprises:

associating the retransmission grant with the initial grant of transmission resources by using the same transmission parameters as in the initial grant, in particular the same frequency resources and time resources, or by signalling an identification.

9. A controller for managing coexisting packet streams in a wireless communication system, wherein a first packet stream of the coexisting packet streams utilizes transmission resources of the wireless communication system at fixed time intervals and a second packet stream of the coexisting packet streams utilizes transmission resources of the wireless communication system at dynamically determined time intervals, wherein the controller comprises a hardware and software-based component that is operative to provide a scheduling unit adapted to set up a schedule defining allocations of transmission resources for the first packet stream, receive a request for an initial grant of transmission resources for a transmission of a data packet of the second packet stream from a sending unit of the second packet stream, analyse, in the process of allocating transmission resources of the wireless communication system to the second packet stream, the schedule of transmission resources allocated to the first packet stream and thereby determine whether a retransmission of the data packet associated with the second packet stream is possible to collide with a transmission of a data packet associated with the first packet stream according to the schedule, and transmit a parameter specifying a number N of retransmissions possible without such collision as part of the initial grant of transmission resources to the sending unit of the second packet stream.

10. A mobile terminal comprising a hardware and software-based component that includes a sending unit for communicating via a packet-based wireless communication system, wherein first packet streams of a plurality of coexisting wireless packet streams utilize transmission resources of the wireless communication system at fixed time intervals and a second packet stream of the plurality of coexisting wireless packet streams utilizes transmission resources of the wireless communication system at dynamically determined time intervals, and wherein the mobile terminal is associated with the second packet stream, wherein the sending unit comprises a controller adapted to send a request for an initial grant of transmission resources for a transmission of a data packet of the second packet stream to a scheduling unit of the communication system, receive a parameter specifying a number N of retransmissions of the data packet as part of the initial grant of network resources from the scheduling unit, and limit the number of retransmissions of the data packet to the specified number N.

* * * * *